US011703457B2

(12) United States Patent
Yang et al.

(10) Patent No.: US 11,703,457 B2
(45) Date of Patent: Jul. 18, 2023

(54) STRUCTURE DIAGNOSIS SYSTEM AND STRUCTURE DIAGNOSIS METHOD

(71) Applicant: Industrial Technology Research Institute, Hsinchu (TW)

(72) Inventors: Yi-Heng Yang, Taipei (TW); Cheng-Yang Tsai, Taipei (TW); Li-Hua Wang, Hsinchu (TW); Tsann-Tay Tang, Taipei (TW); Te-Ming Chen, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 284 days.

(21) Appl. No.: 17/135,999

(22) Filed: Dec. 29, 2020

(65) Prior Publication Data

US 2022/0205926 A1    Jun. 30, 2022

(51) Int. Cl.
*G01N 21/88* (2006.01)
*G01S 17/89* (2020.01)
(Continued)

(52) U.S. Cl.
CPC .......... *G01N 21/8851* (2013.01); *G01S 17/86* (2020.01); *G01S 17/89* (2013.01);
(Continued)

(58) Field of Classification Search
CPC ....... G01N 2021/8887; G01N 21/8851; G01N 21/88; G01N 21/9515; G01N 2021/8861;
(Continued)

(56) References Cited

U.S. PATENT DOCUMENTS 7,995,054 B2    8/2011    Wheeler et al.
8,042,056 B2   10/2011    Wheeler et al.
(Continued)

FOREIGN PATENT DOCUMENTS

CN    104268935 A  *  1/2015  ............. G06T 17/05
CN    106844983 A  *  6/2017  ............. G06F 30/13
(Continued)

OTHER PUBLICATIONS

A. K. Aijazi et al., "Detecting and Analyzing Corrosion Spots on the Hull of Large Marine Vessels Using Colored 3D Lidar Point Clouds," ISPRS Annals of Photogrammetry, Remote Sensing and Spatial Information Sciences, vol. III-2, Jun. 2016, pp. 153-160.
(Continued)

*Primary Examiner* — Michael P Stafira
(74) *Attorney, Agent, or Firm* — JCIPRNET (57) ABSTRACT

The disclosure provides a structure diagnosis system and a structure diagnosis method. The structure diagnosis system includes: a lidar scanner scanning a structure to generate a point cloud data; an input interface receiving the point cloud data; and a processor receiving the point cloud data and generating a point cloud data set. The processor executes a surface degradation and geometry abnormal coupling diagnosis module to: marking a first point cloud range of a surface degradation area according to color space value of the point cloud data set; marking a second point cloud range of a geometry abnormal area according to coordinate value of the point cloud data set; when an abnormal area includes the first point cloud range and the second point cloud range at least partially overlapping each other, determining surface degradation or geometry abnormal occurring at the abnormal area and mark the abnormal area with a predetermined mode.

20 Claims, 4 Drawing Sheets

(51) Int. Cl.
*G06T 17/00* (2006.01)
*G06N 20/00* (2019.01)
*G01S 17/86* (2020.01)
*G06T 7/00* (2017.01)

(52) U.S. Cl.
CPC .......... *G06N 20/00* (2019.01); *G06T 7/0002* (2013.01); *G06T 17/00* (2013.01); *G01N 2021/8887* (2013.01); *G06T 2207/10028* (2013.01); *G06T 2207/20084* (2013.01)

(58) Field of Classification Search
CPC ....... G01N 21/956; G01S 17/42; G01S 17/88; G01S 17/50; G01S 17/86; G01S 17/89; G01S 7/4812; G01S 7/4817; G01S 7/4808; G01S 17/931; G01S 7/4802; G01S 13/867; G01S 13/931; G01S 7/417; G01S 17/894; G01S 2013/9323; G01S 19/42; G01S 17/875; G01S 13/865; G01S 13/9076; G01S 17/06; G01S 17/46; G01S 17/90; G01S 17/08; G01S 17/48; G01S 17/87; G01S 17/933; G01S 7/4813; G01S 7/4815; G01S 7/4816; G01S 13/89; G01S 2013/9316; G01S 2013/9318; G01S 2013/93185; G01S 2013/9319; G01S 2013/9322; G01S 2013/93271; G01S 2013/93272; G01S 2013/93273; G01S 2013/93274; G01S 2013/93275; G01S 2013/93276; G01S 3/782; G01S 5/16; G01S 7/003; G01S 7/4914; G01S 7/4972; G01S 15/02; G01S 15/931; G01S 17/006; G01S 17/02; G01S 7/481; G01S 7/497; G01S 7/51; G06T 17/05; G06T 2215/16; G06T 2207/10028; G06T 7/0004; G06T 2207/20084; G06T 2207/30184; G06T 2207/10032; G06T 2207/30164; G06T 2207/10016; G06T 2207/10024; G06T 2207/20076; G06T 2207/20221; G06T 7/0002; G06T 7/0008; G06T 19/20; G06T 13/20; G06T 19/006; G06T 2207/20081; G06T 2207/30132; G06T 2210/04; G06T 2219/2021; G06T 7/11; G06T 7/12; G06T 7/74; G06T 17/00; G06T 2207/30188; G06T 2210/56; G06T 2219/004; G06T 2219/2012; G06T 7/0012; G06T 7/20; G06T 2207/30252; G06T 7/70; G06T 2200/04; G06T 7/73; G06T 7/33; G06T 2207/20072; G06T 7/10; G06T 19/00; G06T 7/002; G06T 7/521; G06T 2210/12; G06T 5/50; G06T 7/50; G06T 7/579; G06T 7/90; G06T 2207/30261; G06T 7/30; G06T 15/04; G06T 2207/10012; G06T 2207/20164; G06T 1/20; G06T 2207/30236; G06T 2219/2004; G06T 7/593; G06T 7/60; G06T 2207/10048; G06T 2207/20021; G06T 2207/30168; G06T 2210/21; G06T 2210/22; G06T 3/0068; G06T 7/13; G06T 7/55; G06T 15/00; G06T 15/08; G06T 2207/30241; G06T 5/002; G06T 7/187; G06T 7/62; G06T 7/80; G06T 9/00; G06T 1/0014; G06T 1/60; G06T 3/4007; G06T 7/38; G06T 7/85; G06T 1/00; G06T 15/20; G06T 19/003; G06T 2207/20016; G06T 2207/30196; G06T 2207/30204; G06T 2219/2016; G06T 3/40; G06T 5/005; G06T 7/00; G06T 7/277; G06T 7/37; G06T 7/75; G06T 9/001; G06T 17/005; G06T 17/10; G06T 2207/10044; G06T 2207/30242; G06T 3/4046; G06T 3/36; G06T 7/248; G06T 7/40; G06T 7/97; G06T 15/10; G06T 2200/24; G06T 2207/10004; G06T 2207/10021; G06T 2207/20061; G06T 2207/30256; G06T 2210/36; G06T 3/0056; G06T 3/4038; G06T 7/246; G06T 7/251; G06T 7/66; G06T 9/40; G06T 11/00; G06T 15/06; G06T 15/506; G06T 2200/08; G06T 2207/10052; G06T 2207/10132; G06T 2207/20152; G06T 2207/30068; G06T 2007/30184; G06T 2207/30244; G06T 2219/028; G06T 3/00; G06T 5/001; G06T 5/007; G06T 7/136; G06T 7/292; G06T 7/344; G06T 9/004

See application file for complete search history.

(56) References Cited

U.S. PATENT DOCUMENTS

| | | | |
|---|---|---|---|
| 8,396,284 | B2 | 3/2013 | Wheeler et al. |
| 8,456,471 | B2 | 6/2013 | Wallace |
| 9,165,383 | B1 * | 10/2015 | Mendez-Rodriguez ..................... G01C 23/00 |
| 9,256,830 | B2 | 2/2016 | Kearns et al. |
| 9,443,312 | B2 | 9/2016 | Schroeter et al. |
| 9,600,928 | B2 | 3/2017 | Bendall et al. |
| 9,609,288 | B1 * | 3/2017 | Richman ................ G06Q 50/16 |
| 9,846,946 | B2 | 12/2017 | Fan et al. |
| 9,950,815 | B2 | 4/2018 | Finn et al. |
| 10,048,379 | B2 | 8/2018 | Markendorf et al. |
| 10,127,685 | B2 | 11/2018 | Qian et al. |
| 10,262,243 | B2 | 4/2019 | Lim et al. |
| 10,645,363 | B2 | 5/2020 | Van Der Zwan et al. |
| 2013/0216089 | A1 * | 8/2013 | Chen ..................... G06T 7/0002 382/100 |
| 2013/0321418 | A1 * | 12/2013 | Kirk ..................... H04N 13/239 345/426 |
| 2017/0068756 | A1 * | 3/2017 | Wilsher ................ G06F 30/15 |
| 2018/0322623 | A1 * | 11/2018 | Memo ..................... G06N 3/084 |
| 2019/0156518 | A1 * | 5/2019 | Mammou ............ G06T 7/0002 |
| 2019/0197340 | A1 | 6/2019 | Li et al. |
| 2019/0311546 | A1 * | 10/2019 | Tay ..................... G05D 1/0088 |
| 2020/0200872 | A1 | 6/2020 | Bockem et al. |
| 2021/0183081 | A1 * | 6/2021 | Wohlfeld ................ G06T 7/001 |
| 2022/0107977 | A1 * | 4/2022 | Marthouse ............ G06F 16/65 |
| 2022/0130145 | A1 * | 4/2022 | Connary ................ G06V 20/10 |

FOREIGN PATENT DOCUMENTS

| | | | | |
|---|---|---|---|---|
| CN | 108957477 | | 12/2018 | |
| CN | 106651925 | B * | 8/2019 | |
| CN | 110210281 | | 9/2019 | |
| CN | 110264507 | | 9/2019 | |
| CN | 109269405 | B * | 10/2019 | .......... G01B 11/002 |
| CN | 110553597 | | 12/2019 | |
| CN | 110824009 | | 2/2020 | |
| CN | 110827398 | | 2/2020 | |
| CN | 111310765 | | 6/2020 | |
| CN | 111402245 | A * | 7/2020 | .......... G01B 11/00 |
| CN | 111694012 | | 9/2020 | |
| CN | 111898474 | | 11/2020 | |
| EP | 3614299 | A1 * | 2/2020 | .......... G01S 17/89 |
| JP | 2013096741 | A * | 5/2013 | |
| KR | 20200018454 | A * | 2/2019 | |
| TW | 201024664 | | 7/2010 | |
| TW | I632347 | | 8/2018 | |
| TW | 202028778 | | 8/2020 | |

(56) References Cited

FOREIGN PATENT DOCUMENTS

WO     WO-2020203263 A1 * 10/2020 ............. G01B 11/30
WO     WO-2021224893 A1 * 11/2021

OTHER PUBLICATIONS

Hyeon Cheol Jo et al., "Non-contact strain measurement for laterally loaded steel plate using LiDAR point cloud displacement data," Sensors and Actuators A: Physical, vol. 283, Nov. 1, 2018, pp. 362-374.
"Notice of allowance of Taiwan Counterpart Application", dated Aug. 18, 2021, p. 1-p. 4.

\* cited by examiner

STRUCTURE DIAGNOSIS SYSTEM AND STRUCTURE DIAGNOSIS METHOD

TECHNICAL FIELD

The disclosure relates to a structure diagnosis system and a structure diagnosis method, and particularly relates to a structure diagnosis system and a structure diagnosis method for automatically diagnosing structure damage.

BACKGROUND

Industrial equipment and public facilities worldwide lose more than US$100 billion annually due to mechanical damage (or geometry abnormalities) and corrosive damage (or surface degradation). Incidents such as oil tank leaks, broken bridges, and corrosion of solar panel support have caused serious losses and affected the stability of supply and transmission in the industrial chain. Structural facilities are large and numerous, and mechanical and corrosive damage require different diagnostic methods. Due to the shortage of professional manpower, the inspection efficiency of structural facilities is low and it is difficult to meet the safety management needs of facilities in various fields in domestic areas.

In terms of mechanical damage, an amount of geometry variation is usually calculated using a manually installed local strain gauge, but it is difficult to detect the size of the defects specified in the regulations. In terms of corrosive damage, the surface color and appearance are usually inspected by human close-up visual inspection, and the treatment order is determined according to the degree of severity. All of the above methods rely heavily on the on-site judgment of professionals and therefore require a lot of time and manpower to proceed. Therefore, it is the goal of the technicians in the art to diagnose structural damage more efficiently.

SUMMARY

In view of this, the disclosure provides a structure diagnosis system and a structure diagnosis method capable of automatically diagnosing structure damage.

The disclosure proposes a structure diagnosis system, including: a lidar scanner, scanning a structure so as to generate a point cloud data; an input interface, coupled to the lidar scanner and receiving the point cloud data; and a processor, coupled to the input interface, receiving the point cloud data and generating a point cloud data set. The processor executes a surface degradation and a geometry abnormal coupling diagnosis module so as to: mark a first point cloud range of a surface degradation area according to a color space value of the point cloud data set; mark a second point cloud range of a geometry abnormal area according to a coordinate value of the point cloud data set; determine, when an abnormal area includes at least partially overlapping area between the first point cloud range and the second point cloud range, that the surface degradation or a geometry abnormality occurs at the abnormal area, and mark the abnormal area with a predetermined mode.

The disclosure proposes a structure diagnosis method, including: scanning a structure so as to generate a point cloud data; receiving the point cloud data and generating a point cloud data set; marking a first point cloud range of a surface degradation area according to a color space value of the point cloud data set; marking a second point cloud range of a geometry abnormal area according to a coordinate value of the point cloud data set; and determining, when an abnormal area includes at least partially overlapping area between the first point cloud range and the second point cloud range, that a surface degradation or a geometry abnormality occurs at the abnormal area, and marking the abnormal area with a predetermined mode.

Based on the above, in the structure diagnosis system and structure diagnosis method of the disclosure, the structure is scanned with a lidar scanner so as to generate a point cloud data set, the first point cloud range of the surface degradation area is marked according to the color space value, and the second point cloud range of the geometry abnormal area is marked according to the coordinate value. When the first point cloud range and the second point cloud range at least partially overlap each other, the surface degradation or the geometry abnormality occurring at the abnormal area is determined, and the abnormal area is marked with a predetermined mode. In this way, the structural damage diagnosis mechanism can be performed more efficiently.

DESCRIPTION OF THE EMBODIMENTS

Figure 1:
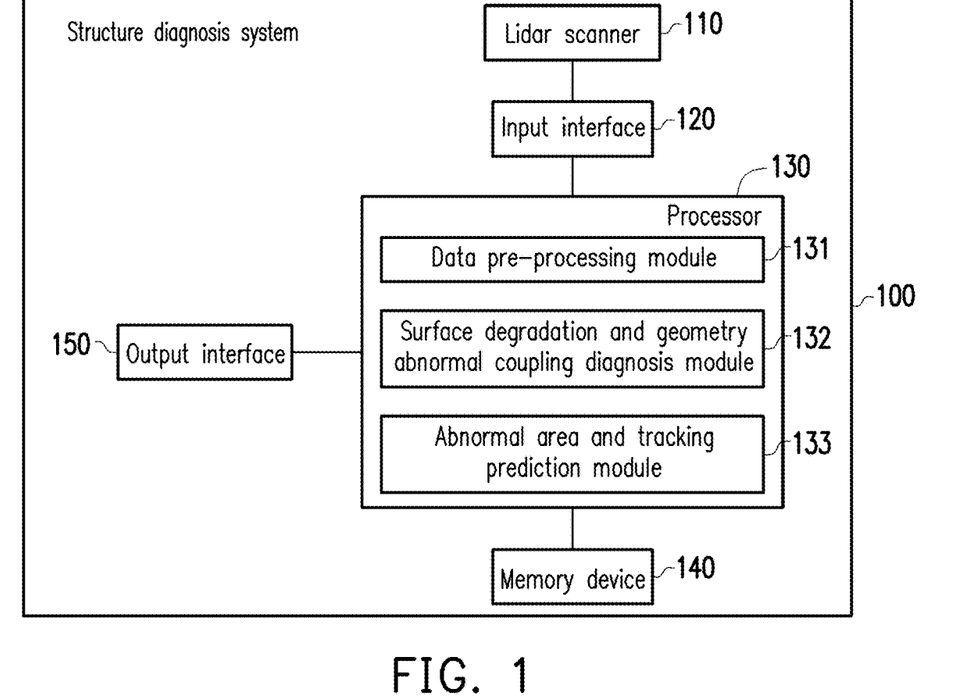
FIG. 1 is a block diagram of a structure diagnosis system according to an embodiment of the disclosure.

FIG. 1 is a block diagram of a structure diagnosis system according to an embodiment of the disclosure.

Referring to FIG. 1, a structure diagnosis system 100 of an embodiment of the disclosure includes a lidar scanner 110, an input interface 120, a processor 130, a memory device 140, and an output interface 150. The lidar scanner 110 is, for example, a three-dimensional lidar scanner and is coupled to the input interface 120. The input interface 120 is coupled to the processor 130. The memory device 140 is coupled to the processor 130. The output interface 150 is coupled to the processor 130. The input interface 120 is, for example, an Ethernet interface or other interfaces that may transmit lidar point cloud data. The processor 130 is, for example, a central processor (CPU) or other similar devices. The memory device 140 is, for example, a volatile memory and/or a non-volatile memory and is configured to store or temporarily store lidar point cloud data. The output interface 150 is, for example, a high definition multimedia interface (HDMI), a display port (DP), or other similar interfaces.

The processor 130 may execute a data pre-processing module 131, a surface degradation and geometry abnormal coupling diagnosis module 132, and an abnormal area tracking and prediction module 133 to process three-dimensional point cloud data generated by the lidar scanner 110 when scanning structures (for example, pipelines, barrels, wind turbine towers, bridges, and support frames, etc.) for diagnosis and tracking/prediction of an abnormal area of the structure, and a result of the diagnosis and tracking/prediction of the abnormal area may be output by the output interface 150. The abnormal area may include a surface degradation area and a geometry abnormal area. The surface degradation area may include defects such as coating blister, peeling, and corrosion. The geometry abnormal area may include defects such as deformation, tilt, and circularity variation. For example, diagnostic information output by the output interface 150 may be information such as abnormal deformation in a coordinate group (5.17, −3.38, 1.00)-(5.17, −3.38, −0.98) with a deformation amount of 3.79 mm; abnormal corrosion on in a coordinate group (4.89, −1.32, −3.97)-(4.92, −1.26, −3.93) with an area of 12 $cm^2$ and a depth of 3 mm; and abnormal coating blister in a coordinate group (4.97, −1.15, −3.84)-(4.98, −1.15, −3.82) with an area of 50 $cm^2$. The above-mentioned coordinate group may also be referred to as a three-dimensional coordinate group. The output interface 150 may also output an incident notification such as "it is diagnosed in yyyy/mm/dd that abnormalities of two corrosions, seven coating blisters, and eight deformations occur at the structure". Further, the output interface 150 may also display the structure and the abnormalities of the corrosions, coating blisters, and deformations by three-dimensional graphics.

In one embodiment, the data pre-processing module 131, the surface degradation and geometry abnormal coupling diagnosis module 132, and the abnormal area tracking and prediction module 133 are implemented by software or firmware and executed by the processor 130, but the disclosure is not limited thereto. In another embodiment, the data pre-processing module 131, the surface degradation and geometry abnormal coupling diagnosis module 132, and the abnormal area tracking and prediction module 133 may also be implemented as hardware circuits in the processor 130 or coupled to the processor. Hereinafter, the data pre-processing module 131, the surface degradation and geometry abnormal coupling diagnosis module 132, and the abnormal area tracking and prediction module 133 will be described in detail.

[Data Pre-Processing]

In one embodiment, the lidar scanner 110 (a three-dimensional lidar scanner) may emit laser light and receive the laser light reflected by the structure to scan the structure so as to generate point cloud data. The input interface 120 may receive the point cloud data and provide the point cloud data to the processor 130. The processor 130 may execute the data pre-processing module 131 so as to receive the point cloud data, reduce or not reduce the point cloud data according to a size of the structure, perform geometry reconstruction on the structure, perform a topological orderly method on the point cloud data, and perform a coordinate registration operation on the point cloud data of different time points undergone the topological orderly method so as to generate a point cloud data set having a time series. The topological orderly method is based on topological information of the point cloud data so as to describe the geometrical feature of the structure correctly. In the coordinate registration operation, coordinate registration may be performed on the point cloud data of different time points according to identified specific features (for example, the nails fixed to the ground on the barrel) or the coordinates of multiple predetermined reference points, which may reduce the position error of the point cloud data at different time points of the same position. It is worth noting that the point cloud data set having time series is the point cloud data set at different time points at the same scanning position. Through the data pre-processing process disclosed in the disclosure, more accurate structure diagnosis and prediction results can be obtained.

[Diagnosis of Abnormal Area of Structure]

In one embodiment, the processor 130 may execute the surface degradation and geometry abnormal coupling diagnosis module 132 so as to perform the following operations. The processor 130 may read a color space value (R, G, B) of the point cloud data set and mark a point cloud range of the surface degradation area (a first point cloud range) according to the color space value of the point cloud data set. Specifically, using a neural network (algorithm), the processor 130 may segment the surface degradation area based on the color space value of the point cloud data set and calculate an area and a depth of the surface degradation area. For example, it can be known from the point cloud data set that the abnormal corrosion occurs at the coordinate group (4.89, −1.32, −3.97)-(4.92, −1.26, −3.93), so the processor 130 can calculate that the area of abnormal corrosion is 12 $cm^2$ and the depth is 3 mm based on the data of the coordinate group (4.89, −1.32, −3.97)-(4.92, −1.26, −3.93). The processor 130 may calculate the area of the surface degradation area by using a percentage of a number of point clouds in the abnormal area to a number of point clouds in the structure. The neural networks may be, for example, convolutional neural network (CNN), fully convolutional networks (FCN), encoder-decoder, recurrent neural network (RNN), generative adversarial network (GAN), and other neural networks.

The processor 130 may also read a coordinate value (X, Y, Z) of the point cloud data set and mark a point cloud range of the geometry abnormal area (a second point cloud range) according to the coordinate value of the point cloud data set. Specifically, the processor 130 segments/divides the geometry abnormal area based on the coordinate value of the point cloud data set along a force direction of the structure and a direction perpendicular to the force direction of the structure, and calculates a position and a deformation amount of the geometry abnormal area.

When the abnormal area includes at least partially overlapping area between the first point cloud range and the second point cloud range, the processor 130 determines that surface degradation or geometry abnormality occurs at the abnormal area, and marks the abnormal area with a predetermined mode. Specifically, when the first point cloud range of the surface degradation area is larger than the second point cloud range of the geometry abnormal area, the processor 130 determines that surface degradation occurs at the abnormal area and marks the first point cloud range in the abnormal area with a predetermined mode. When the first point cloud range of the surface degradation area is smaller than the second point cloud range of the geometry abnormal area, the processor 130 determines that the geometry abnormality occurs at the abnormal area and marks the second point cloud range in the abnormal area with a predetermined mode. For example, when marking the abnormal area, the first point cloud range, or the second point cloud range with the predetermined mode, predetermined colors, arrow markings, block selection, and the like may be used to mark the abnormal area, the first point cloud range, or the second point cloud range, such that users can clearly identify. The disclosure does not limit the implementation of the predetermined mode.

[Tracking/Prediction of Abnormal Area of Structure]

In one embodiment, the processor 130 may execute the abnormal area tracking and prediction module 133 to predict a variation status of the abnormal area at a next time point based on the point cloud of the abnormal area where the geometry abnormality occurs at a consecutive time point using a machine learning algorithm. The machine learning algorithms are, for example, linear regression, support vector regression (SVR), ensemble learning, and other machine learning algorithms. In other words, the processor 130 may track whether the same abnormal area persists or has a trend of expansion, and learn the variation trend through consecutive point clouds having different time markings using the machine learning algorithm, so as to predict the variation status at the next time point. For example, a large amount of variation trend data of different structures at multiple time points may be input into the machine learning algorithm for training. Taking depression depth as a simple example, when a depression depth of the abnormal area at a time point T0 is 1 mm and a depression depth at a time point T1 is 2 mm, the machine learning algorithm determines that the depression depth at a time point T2 is 3 mm according to training results, where a time interval from the time point T0 to the time point T1 may be the same or different from a time interval from the time point T1 to the time point T2. It is worth noting that the machine learning algorithm may be trained with a large amount of data (for example, multiple sets of depression depth information that changes over time) so as to make a more accurate prediction of the depression depth at the time point T2.

Figure 2:
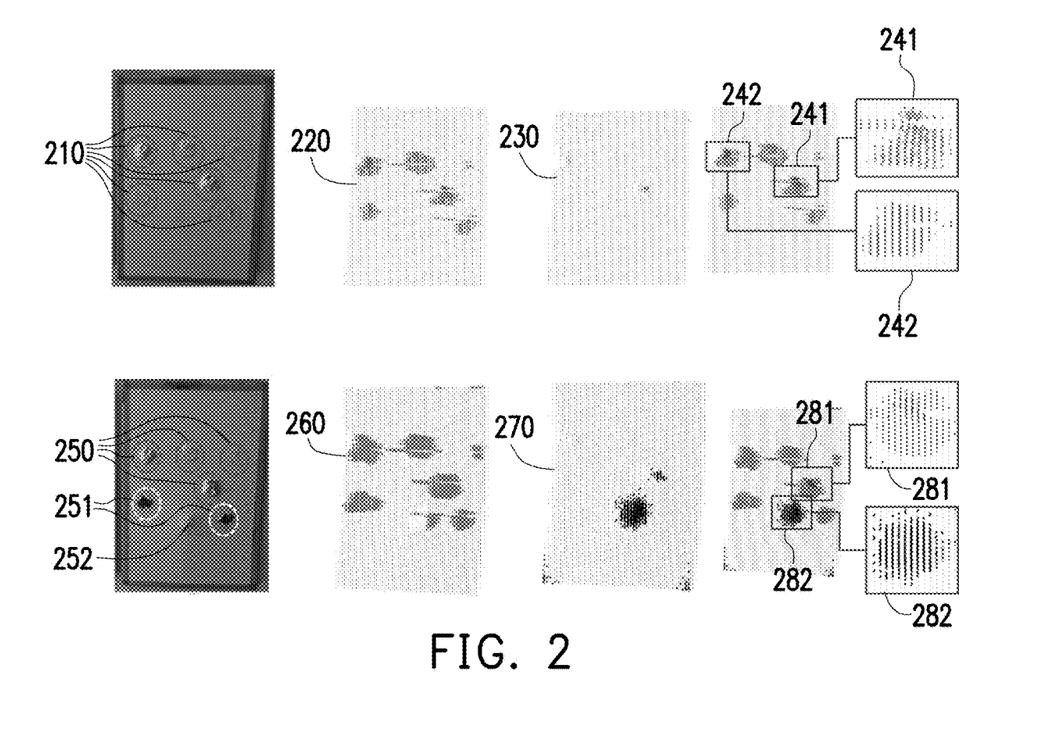
FIG. 2 is an example of surface degradation and geometry abnormal coupling diagnosis according to an embodiment of the disclosure.

FIG. 2 is an example of surface degradation and geometry abnormal coupling diagnosis according to an embodiment of the disclosure.

Please refer to FIG. 2. In the present example, a PU coated steel plate having a size of 10×15 cm$^2$ is obtained, a surface degradation defect (i.e. coating blister and corrosion) is created by electrochemical discharge and salt spray test, and a locally deformed area is created by hitting the steel plate with an external force. Then, the steel plate is scanned with the lidar five meters away from the steel plate so as to obtain point cloud data, and the damage of the steel plate is diagnosed by the surface degradation and geometry abnormal coupling diagnosis module 132.

[Time Point T0]

The steel plate includes six blister defects 210, and a surface degradation set 220 and a geometry abnormal set 230 are diagnosed by the surface degradation and geometry abnormal coupling diagnosis module 132. The surface degradation set 220 includes a point cloud range of six surface degradations (i.e. the first point cloud range), and the geometry abnormal set 230 includes a point cloud range of two geometry abnormalities (i.e. the second point cloud range). The surface degradation set 220 may be marked according to the color space values (R, G, B) of the point cloud data set and the geometry abnormal set 230 may be marked according to the coordinate value (X, Y, Z) of the point cloud data set. After the coordinates of the surface degradation set 220 and the geometry abnormal set 230 are coupled, an abnormal area 241 and an abnormal area 242 in which the coordinates of the surface degradation set 220 and the geometry abnormal set 230 at least partially overlap each other can be generated. In other words, through the coordinate coupling between the surface degradation set 220 and the geometry abnormal set 230, the area where the three-dimensional coordinate group of the surface degradation set 220 and the three-dimensional coordinate group of the geometry abnormal set 230 at least partially overlap each other is identified. The coordinate coupling is different from the coordinate registration operation performed on the point cloud data in the data pre-processing process of the disclosure. The point cloud range of the surface degradation in the abnormal area 241 is larger than the point cloud range of the geometry abnormality, therefore surface degradation blister is identified. The point cloud range of the surface degradation in the abnormal area 242 is larger than the point cloud range of the geometry abnormality, therefore surface degradation blister is identified.

[Time Point T1]

The steel plate includes four blister defects 250, two corrosions 251 from blister defects, and one new deformation 252, and a surface degradation set 260 and a geometry abnormal set 270 are diagnosed by the surface degradation and geometry abnormal coupling diagnosis module 132. The surface degradation set 260 includes a point cloud range of seven surface degradations (i.e. the first point cloud range), and the geometry abnormal set 270 includes a point cloud range of two geometry abnormalities (i.e. the second point cloud range). The surface degradation set 260 may be marked according to the color space value (R, G, B) of the point cloud data set and the geometry abnormal set 270 may be marked according to the coordinate value (X, Y, Z) of the point cloud data set. After the coordinates of the surface degradation set 260 and the geometry abnormal set 270 are coupled, an abnormal area 281 and an abnormal area 282 in which the coordinates of the surface degradation set 260 and the geometry abnormal set 270 at least partially overlap each other can be generated. The point cloud range of the surface degradation in the abnormal area 281 is larger than the point cloud range of the geometry abnormality, therefore surface degradation blister is identified. The point cloud range of the surface degradation in the abnormal area 282 is smaller than the point cloud range of the geometry abnormal, therefore geometry deformation is identified.

Figure 3:
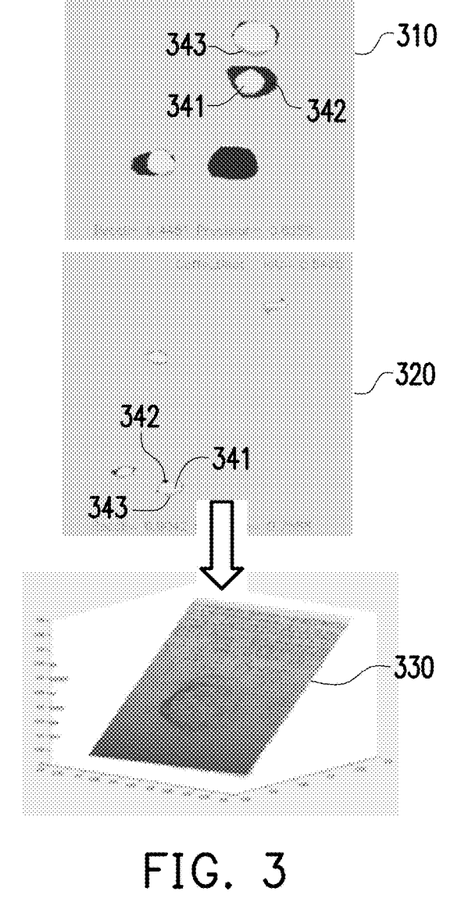
FIG. 3 is an example of segmenting a surface degradation area and calculating an area depth using a neural network according to an embodiment of the disclosure.

FIG. 3 is an example of segmenting a surface degradation area and calculating an area depth using a neural network according to an embodiment of the disclosure.

Please refer to FIG. 3. In the present example, 700 corrosions and blister defects respectively having dimensions of 5 mm/10 mm/20 mm are created on 170 steel plate samples, a three-dimensional point cloud scan is performed with the lidar five meters away from the samples, and training is carried out through the neural network. For example, the three-dimensional point cloud data may be input to a convolutional layer and a pooling layer with interleaved convolutional neural network so as to perform feature extraction and to output a feature classification result through a fully connected layer. A rectified linear unit (ReLU) function or other functions may be used in the convolutional layer as an excitation function. Finally, 97 images of corrosions and blister defects are tested for an identification rate. In a blister sample 310 of 20 mm and a corrosion sample 320 of 10 mm, a hit area 341, a miss area 342, and a false alarm area 343 can be seen. Finally, an estimation diagram of area and depth of surface degradation 330 is generated. The three axes of the estimation diagram 330 are, for example, X axis, Y axis, and Z axis, in mm.

Table 1 is a comparison table of the defect identification rate of the present example.

TABLE 1

| Scanning distance 5 m | | Identification rate test | |
| --- | --- | --- | --- |
| Defect type | Size | Recall rate | Total recall rate |
| Coating blister | 5 mm | 79% | 78% |
| | 10 mm | 73% | |
| | 20 mm | 80% | |

TABLE 1-continued

| Scanning distance 5 m | | Identification rate test | |
| --- | --- | --- | --- |
| Defect type | Size | Recall rate | Total recall rate |
| Corrosion | 5 mm | 82% | 85% |
| | 10 mm | 88% | |
| | 20 mm | 85% | |

It can be seen from Table 1 that in the experiment of the disclosure, the total recall rate for the coating blister defects of 5 mm, 10 mm, and 20 mm is 78%, and the total recall rate for the corrosion defects of 5 mm, 10 mm, and 20 mm is 85%.

Table 2 is a comparison table between the measurement results of the present example and the actual results.

TABLE 2

| | Test result | Actual result |
| --- | --- | --- |
| Corrosion area | 249 mm$^2$ | 237 mm$^2$ |
| Corrosion depth | 4.41 mm | 4.76 mm |

It can be seen from Table 2 that the measurement result of the corrosion area in the present experiment of the disclosure differs from the actual result by 12 mm$^2$, and the measurement result of the corrosion depth differs from the actual result by 0.35 mm.

Figure 4:
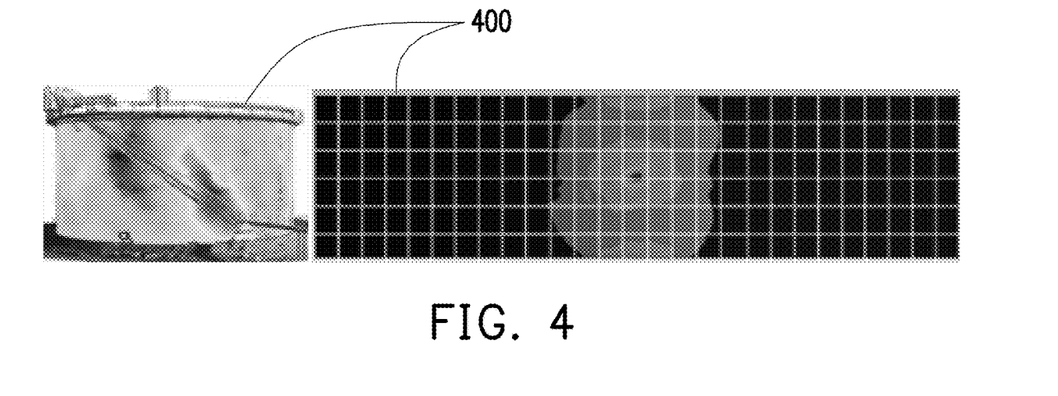
FIG. 4 is an example of calculating an amount of geometry deformation of a structure according to an embodiment of the disclosure.

FIG. 4 is an example of calculating an amount of geometry deformation of a structure according to an embodiment of the disclosure.

Referring to FIG. 4, an experiment is carried out with a barrel structure. After processing, a point cloud data set 400 obtained by scanning may identify current defect status of the barrel, and the point cloud data set 400 at different time points may predict the defect trend of the barrel. For example, barrel defect identification may include identification for vertical deformation range, identification for radial deformation of wall, and identification for circularity of wall. The trend prediction target for the identification of vertical deformation range and the identification of radial deformation of wall may be whether a radial deformation amount and range within every 8 inches exceeds the regulatory limit (for example, 3.6 inches). The trend prediction target for the identification of circularity of wall may be calculated after the combination of the vertical deformation of each angle. The geometry deformation amount calculation of the structure disclosed in the disclosure may cover 0-29.8% of the deformation range.

Figure 5:
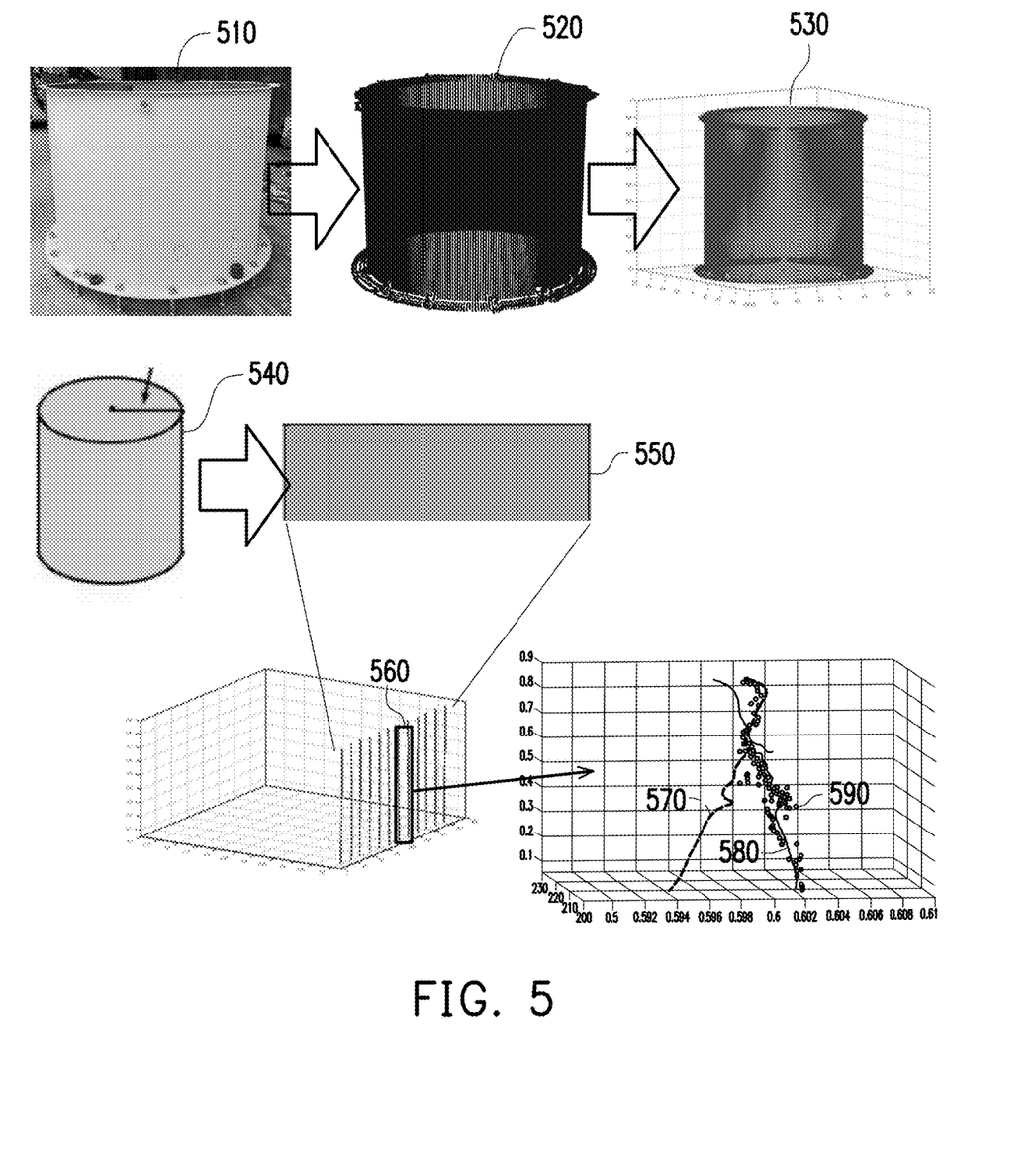
FIG. 5 is an example of predicting a deformation trend of a structure according to an embodiment of the disclosure.

FIG. 5 is an example of predicting a deformation trend of a structure according to an embodiment of the disclosure.

Please refer to FIG. 5, a point cloud data set 520 of a barrel 510 without external support force can be obtained by scanning through a lidar scanner and calculation through the data pre-processing module 131. Based on the point cloud data set 520, the abnormal area tracking and prediction module may predict a point cloud coordinate 530 of the barrel wall after being applied 3 mm external support. For example, a side of a barrel 540 may be unfolded cylindrically to be a rectangular 550 and the point cloud is extracted every 30 degrees (that is, the point cloud data set 520 is segmented along the force direction of the barrel 510 and the direction perpendicular to the force direction of the vertical barrel 510) for viewing so as to generate multiple point cloud subsets 560 of the barrel wall. A point cloud 570 is a measured point cloud without external support. A point cloud 580 is a measured point cloud after external support. A point cloud 590 is a predicted point cloud after external support. In the present example, a mean square error (MSE) of the measured point cloud after external support and the predicted point cloud after external support is 1.13%, and a mean absolute error (MAE) is 1.66 mm.

Figure 6:
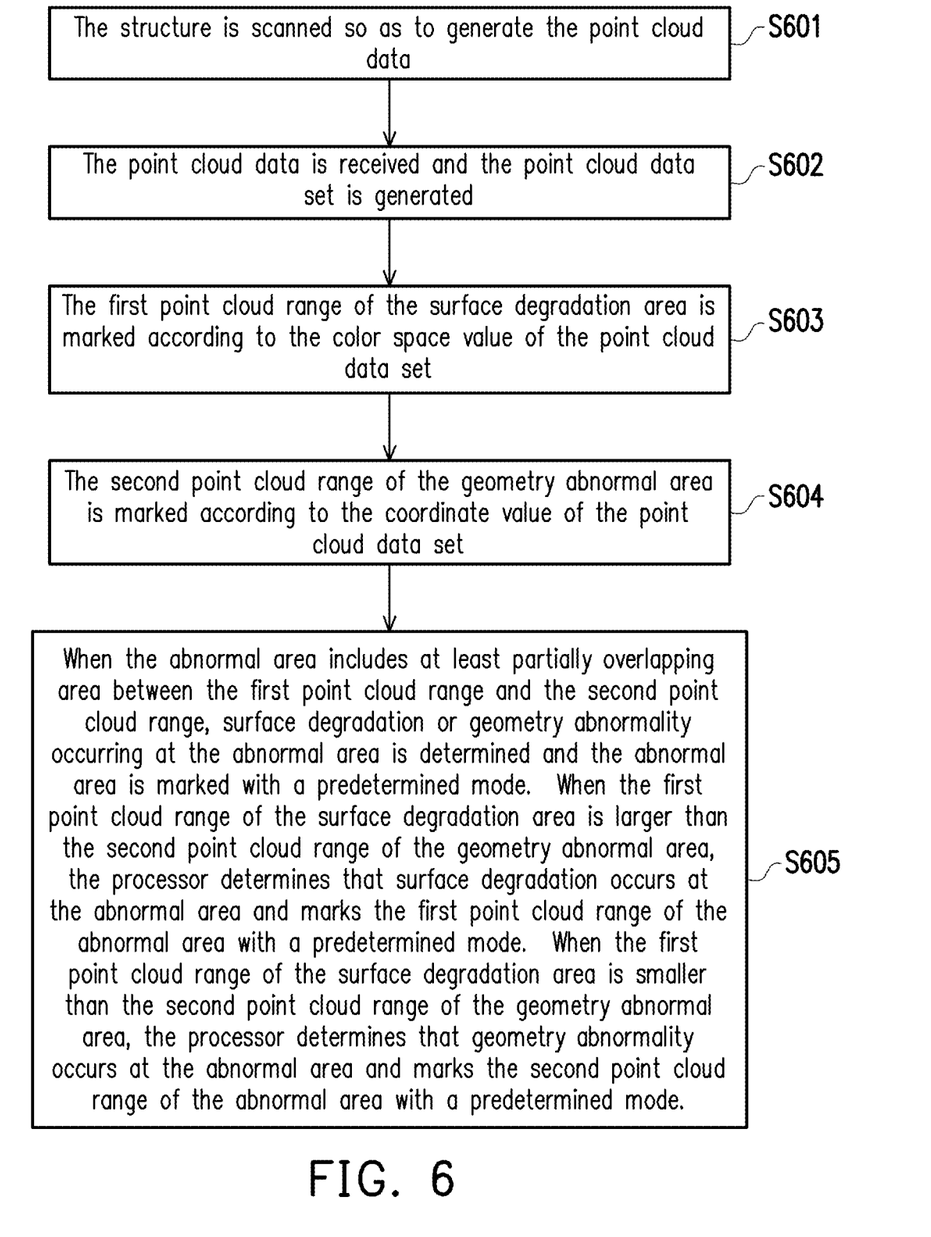
FIG. 6 is a flowchart of a structure diagnosis method according to an embodiment of the disclosure.

FIG. 6 is a flowchart of a structure diagnosis method according to an embodiment of the disclosure.

Please refer to FIG. 6. In step S601, the structure is scanned so as to generate the point cloud data.

In step S602, the point cloud data is received and the point cloud data set is generated.

In step S603, the first point cloud range of the surface degradation area is marked according to the color space value of the point cloud data set.

In step S604, the second point cloud range of the geometry abnormal area is marked according to the coordinate value of the point cloud data set.

In step S605, when the abnormal area includes at least partially overlapping area between the first point cloud range and the second point cloud range, surface degradation or geometry abnormality occurring at the abnormal area is determined and the abnormal area is marked with a predetermined mode. When the first point cloud range of the surface degradation area is larger than the second point cloud range of the geometry abnormal area, the processor determines that the surface degradation occurs at the abnormal area and marks the first point cloud range in the abnormal area with a predetermined mode. When the first point cloud range of the surface degradation area is smaller than the second point cloud range of the geometry abnormal area, the processor determines that the geometry abnormality occurs at the abnormal area and marks the second point cloud range in the abnormal area with a predetermined mode.

To sum up, in the structure diagnosis system and structure diagnosis method of the disclosure, the structure is scanned with a lidar scanner so as to generate a point cloud data set, the first point cloud range of the surface degradation area is marked according to the color space value, and the second point cloud range of the geometry abnormal area is marked according to the coordinate value. When the first point cloud range and the second point cloud range at least partially overlap each other, the surface degradation or the geometry abnormality occurring at the abnormal area is determined, and the abnormal area is marked with a predetermined mode. In this way, the diagnosis of structural damage mechanism can be performed more efficiently.

Although the disclosure has been disclosed in the above embodiments, they are not intended to limit the disclosure. Anyone with ordinary knowledge in the relevant technical field may make some changes and modifications without departing from the spirit and scope of this disclosure. Therefore, the scope of protection of this disclosure shall be subject to those defined by the attached claims.

What is claimed is:

1. A structure diagnosis system, comprising:
a lidar scanner, configured to scan a structure so as to generate a point cloud data;
an input interface, coupled to the lidar scanner and configured to receive the point cloud data; and
a processor, coupled to the input interface, configured to receive the point cloud data and generate a point cloud data set, wherein the processor executes a surface degradation and a geometry abnormal coupling diagnosis module so as to:

mark a first point cloud range of a surface degradation area according to a color space value of the point cloud data set;

mark a second point cloud range of a geometry abnormal area according to a coordinate value of the point cloud data set;

determine, when an abnormal area comprises at least partially overlapping area between the first point cloud range and the second point cloud range, that the surface degradation or the geometry abnormality occurs at the abnormal area, and mark the abnormal area with a predetermined mode.

2. The structure diagnosis system as described in claim 1, wherein the point cloud data is a three-dimensional point cloud data.

3. The structure diagnosis system as described in claim 1, wherein, when the first point cloud range of the surface degradation area is larger than the second point cloud range of the geometry abnormal area, the processor determines that the surface degradation occurs at the abnormal area and marks the first point cloud range in the abnormal area with the predetermined mode.

4. The structure diagnosis system as described in claim 1, wherein, when the first point cloud range of the surface degradation area is smaller than the second point cloud range of the geometry abnormal area, the processor is further configured to determine that the geometry abnormality occurs at the abnormal area and mark the second point cloud in the abnormal area with the predetermined mode.

5. The structure diagnosis system as described in claim 1, wherein the processor is further configured to execute an abnormal area tracking and prediction module so as to predict a variation status of the abnormal area at a next time point based on a point cloud of the abnormal area where the geometry abnormality occurs at a consecutive time point using a machine learning algorithm.

6. The structure diagnosis system as described in claim 1, wherein the processor is further configured to execute a data pre-processing module so as to: receive the point cloud data, reduce or not reduce the point cloud data according to a size of the structure, perform a topological orderly method on the point cloud data, and perform a coordinate registration operation on the point cloud data of different time points undergone the topological orderly method so as to generate the point cloud data set having a time series.

7. The structure diagnosis system as described in claim 1, wherein the processor is further configured to segment the surface degradation area based on the color space value of the point cloud data set and calculate an area and a depth of the surface degradation area using a neural network.

8. The structure diagnosis system as described in claim 1, wherein the processor is further configured to segment the geometry abnormal area based on the coordinate value of the point cloud data set along a force direction and a direction perpendicular to the force direction, and calculate physical quantity of the geometry abnormal area.

9. The structure diagnosis system as described in claim 1, wherein the surface degradation area comprises defects of coating blister, peeling, and corrosion.

10. Structure diagnostic system as described in claim 1, wherein the geometry abnormal area comprises defects of deformation, inclination, and circularity variation.

11. Structure diagnosis method, comprising:

scanning a structure so as to generate a point cloud data;

receiving the point cloud data and generating a point cloud data set;

marking a first point cloud range of a surface degradation area according to a color space value of the point cloud data set;

marking a second point cloud range of a geometry abnormal area according to a coordinate value of the point cloud data set; and determining, when an abnormal area comprises at least partially overlapping area between the first point cloud range and the second point cloud range, that a surface degradation or a geometry abnormality occurs at the abnormal area, and marking the abnormal area with a predetermined mode.

12. Structure diagnosis method as described in claim 11, wherein the point cloud data is a three-dimensional point cloud data.

13. Structure diagnosis method as described in claim 11, further comprising: determining, when the first point cloud range of the surface degradation area is larger than the second point cloud range of the geometry abnormal area, that the surface degradation occurs at the abnormal area and marking the first point cloud range in the abnormal area with the predetermined mode.

14. Structure diagnosis method as described in claim 11, further comprising: determining, when the first point cloud range of the surface degradation area is smaller than the second point cloud range of the geometry abnormal area, that the geometry abnormality occurs at the abnormal area and marking the second point cloud range in the abnormal area with the predetermined mode.

15. Structure diagnosis method as described in claim 11, further comprising: predicting a variation status of the abnormal area at a next time point based on the point cloud of the abnormal area where the geometry abnormality occurs at a consecutive time point using a machine learning algorithm.

16. Structure diagnosis method described in claim 11, further comprising: receiving the point cloud data, reducing or not reducing the point cloud data according to a size of the structure, performing a topological orderly method on the point cloud data, and performing a coordinate registration operation on the point cloud data of different points undergone the topological orderly method, so as to generate the point cloud data set in a time series.

17. Structure diagnosis method as described in claim 11, further comprising: segmenting the surface degradation area based on the color space value of the point cloud data set and calculating an area and a depth of the surface degradation area using a neural network.

18. Structure diagnosis method as described in claim 11, further comprising: segmenting the geometry abnormal area based on the coordinate value of the point cloud data set along a force direction and a direction perpendicular to the force direction, and calculating a deformation amount of the geometry abnormal area.

19. Structure diagnosis method as described in claim 11, wherein the surface degradation area comprises defects of coating blister, peeling, and corrosion.

20. Structure diagnosis method as described in claim 11, wherein the geometry abnormal area comprises defects of deformation, inclination, and circularity variation.

* * * * *